United States Patent [19]

Aalbersberg

[11] Patent Number: 5,293,552
[45] Date of Patent: Mar. 8, 1994

[54] METHOD FOR STORING BIBLIOMETRIC INFORMATION ON ITEMS FROM A FINITE SOURCE OF TEXT, AND IN PARTICULAR DOCUMENT POSTINGS FOR USE IN A FULL-TEXT DOCUMENT RETRIEVAL SYSTEM

[75] Inventor: Ijsbrand J. Aalbersberg, Eindhoven, Netherlands

[73] Assignee: U.S. Philips Corporation, New York, N.Y.

[21] Appl. No.: 860,615

[22] Filed: Mar. 30, 1992

[30] Foreign Application Priority Data

Apr. 8, 1991 [EP] European Pat. Off. ......... 91200810.9

[51] Int. Cl.[5] ............................................. G06F 15/40
[52] U.S. Cl. ................................................. 364/419.19
[58] Field of Search ............... 364/419, 419.13, 419.19, 364/419.07

[56] References Cited

U.S. PATENT DOCUMENTS

| | | | |
|---|---|---|---|
| 4,318,184 | 3/1982 | Millet et al. | 364/900 |
| 4,554,631 | 11/1985 | Reddington | 364/300 |
| 4,817,036 | 3/1989 | Millet et al. | 364/900 |
| 4,868,733 | 9/1989 | Fujisawa et al. | 364/200 |
| 5,062,074 | 10/1991 | Kleinberger | 364/900 |

OTHER PUBLICATIONS

G. Salton et al., "Term-Weighting Approaches In Automatic Text Retrieval", Information Processing & Management, vol. 24, No. 5, pp. 513–523, 1988.
L. Egghe, "On The Classification Of The Classification Bibliometric Laws", Journal of Documentation, vol. 44, No. 1, Mar. 1988, pp. 53–62.

*Primary Examiner*—Donald E. McElheny, Jr.
*Attorney, Agent, or Firm*—Anne E. Barschall

[57] ABSTRACT

A method to compress, store, and retrieve bibliometric information on multiple sources of text is presented. The compression consists of 2 parts, and may use any one of the many ordering-based bibliometric laws for sources of text. The first compression part comprises of the storage of bibliometric information on the items from a text source, using the rank of the items in the ordering relation as defined in the bibliometric law as an indication of the bibliometric information. The second compression part efficiently uses pointers and tables to get rid of redundant information. As an application, a posting compression method is presented for use in term weighting retrieval systems. The first compression uses a postulated rank-occurrence frequency relation for the document in question that has as only variable the document's length, for example Zipf's law that states that the product of rank and frequency is approximately constant. The second compression part efficiently uses pointers and a few tables next to the principal storage. The compression makes use of direct random addressability. All postings relating to a particular document may be stored together, allowing easy expendability and updating. With respect to conventional technology, storage requirements is roughly halved.

9 Claims, 2 Drawing Sheets ained into the item's rank numbers in the particular source

METHOD FOR STORING BIBLIOMETRIC INFORMATION ON ITEMS FROM A FINITE SOURCE OF TEXT, AND IN PARTICULAR DOCUMENT POSTINGS FOR USE IN A FULL-TEXT DOCUMENT RETRIEVAL SYSTEM

FIELD OF THE INVENTION

The invention relates to a method for storing bibliometric information on items from a finite source of text. For the terminology used, reference is had to an article by L. Egghe, "On the Classification of the Classical Bibliometric Laws", Journal of Documentation, Vol. 44, No. 1, March 1988, pages 53–62. Bibliometric information on an item indicates everything that can be said of the item in the source, while abstracted of the meaning of the item. By way of non-limitative examples, bibliometric information can have indications on:

how often the item in question occurs in the source (usually a text);

what is the spread in its occurrences, e.g., are they clustered or not;

any spatial relationship with another item in the source;

in what positions it occurs, such as in headers only.

As clear from the references in Egghe, bibliometry as a science is at least twenty years old. Now, a general object of the present invention is the quest for compact and easy storage and handling of the bibliometric information, in particular directed to, but not limited to retrieval and otherwise management of the text source itself. One of the key understandings of the present invention is that the bibliometric information may not be a very accurate quantity, in the sense that appreciable variation therein may leave the underlying information intact to a high degree.

SUMMARY TO THE INVENTION

According to one of its aspects, the invention provides a method for storing bibliometric information on items in a finite source of text, using a postulated relationship between the bibliometric property of an item and its rank number in a linear ordering of all items in said source, said method comprising the steps of:

a) for any item in said source, positioning it properly in the said linear ordering and therefrom determining the item's rank number in the ordering, b) for any item in said source, storing the item's rank number as determined in a) above, as an indication of that unique item's bibliometric property.

A linear ordering means that each item has a relative position with any other item, and therefore be assigned a unique rank number. The storage of the rank number is now an inexpensive surrogate for storing the bibliometric property itself, which in many cases saves 50% of the storage space, while maintaining accessibility. In the foregoing, the linear ordering may be bibliometrical or otherwise, for example alphabetical according to author, or chronologically according to date of generation. In principle, many other linear orderings are feasible.

According to a further advantageous aspect, said method comprises the linking of the bibliometric information corresponding items in any of multiple sources, said method comprising the steps of:

a) assigning to each item in the particular source a sequence number based on address mapping transform that is uniform among said sources and preserves rank order;

b) for each source, storing a sequence of tuples, each of which is assigned to a unique item in its source, and each tuple comprising:

b1) an identifier for a next successive source comprising the same unique item, and b2) an offset value indicating both that unique item's sequence number in the source so identified as well as that unique item's rank number in said linear ordering as indication of that unique item's bibliometric property.

Linked lists find another advantageous use in the present invention.

FURTHER ASPECTS OF THE INVENTION

In a particular field of use, the invention relates to a method for storing document postings (vide infra) for use in a full-text document retrieval system, and in particular the kind of retrieval wherein each lexical term in a document gets assigned a weight, the weight indicating the relevance of the term in the document. The invention is particularly advantageous if the system is used in a dynamic environment. Conventional weight assigning has been described in G. Salton and C. Buckley, "Term-weighting Approaches in Automatic Text Retrieval", Information Processing and Management 24, (1988), 513–523, especially page 518 that lists various weighting systems as based on various usages of such weight components as term frequency, collection frequency, and normalization. In a dynamic retrieval environment, the set of documents is not fixed, especially because documents may be added and/or deleted. Usually, the use of weights is that some kind of ranking of the documents is effected according to their matching with some exemplary term, term string or set, or text, taking into account the matching of on weight basis. After the ranking of the documents, it would be up to a user to access one or more of the whole documents for further use, but the latter operation does not form part of the present invention. The invention is based, firstly, on the insight that the weight is not a very accurate quantity, but is linked accurately enough to another quantity, to wit the occurrence frequency of each lexical term so that the latter may be used instead. Secondarily, the storage of postings that relate to the same lexical term may be linked in a chain by including in each posting adequate pointer information. Herein, a posting is defined as an information item that is uniquely associated to a particular lexical term in a document, and therefore, to all occurrencies of that same particular lexical term in the single document. The posting comprises at least an identifier of the document in question and also an indication of the weight of the associated term in the document. In an extended version, the posting also comprises an identifier of the lexical term itself. According to yet another aspect, the invention provides a method as recited supra that allows for restricted storage space, uncompromised searching speed, while still allowing for expanding the data base and replacing documents by other documents in that it provides a method, for storing document postings in a full-text document retrieval system, using a postulated relationship between a term's occurrence frequency rank and its nominal weight, said relationship depending exclusively on this rank and on the number of different terms in a particular document as variables, said method comprising the steps of:

a. for any lexical term in said particular document calculating its occurrence frequency and therefrom said lexical term's rank in the occurrence frequency ordering;
b. storing a normalization factor as governed by said relationship;
c. assigning to each term in the particular document a sequence number based on standard address mapping transform that is uniform among said documents and preserving said rank order;
d. for each document storing a sequence of postings each assigned to a unique lexical term in the document according to its assigned sequence number, each posting comprising:
   d1. an identifier for a next successive document comprising the same unique term;
   d2. an offset value operating as pointer in said next successive document while indicating said unique term's posting's sequence number in said next successive document as well as a direct indication of that unique term's weight in the document so identified.

The invention also relates to a document retrieval system based on a data base generated by any of the proceedings. The data base could be provided on CD-ROM or on-line, whereas the retrieval could make use of a random-accessible store.

Further advantageous aspects are recited in dependent claims.

BRIEF DESCRIPTION OF THE FIGURES

Hereinafter, first a background consideration is presented for the invention, after which is preferred embodiment is detailed in and by the following Figures which respectively show.

BACKGROUND CONSIDERATION

Figure 1:
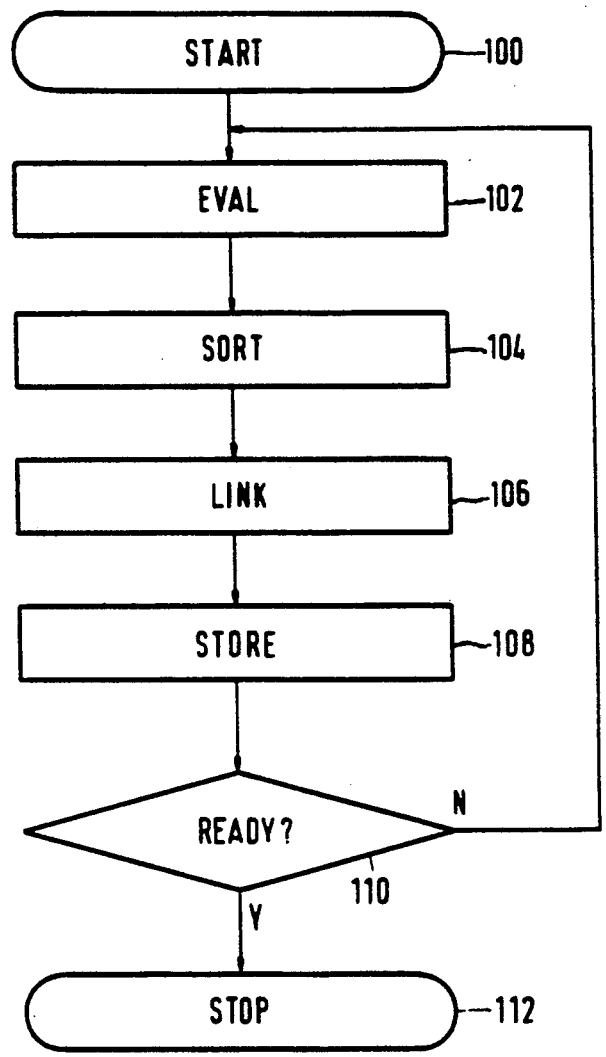
FIG. 1 a flow chart of the storage process of a document.

Hereinafter, we report on the compression of postings in order to store as many postings as possible in the memory of a term weighting document retrieval system. Advantageously, the memory is directly addressable, such as a solid state main computer memory, for realizing high processing speed. This resulted in a posting compression technique that reduces the storage size for postings by 25% to 50%. The compression technique does not need any extensive indexing during the insertion of new documents, and thus can be used in highly dynamic retrieval environments. Since the technique is based on the vector space retrieval model, the retrieval quality is high.

In term weighting retrieval a term weight becomes associated with each term that occurs in a text. Such a text can be either the text of a document in a document base or the text of a query as raised by a user (a document can contain more than only textual information). A term weight w, when associated with a term (or word or word stem) s in a text t, indicates the relevance of s in t, and it is a real number which usually after normalization lies between 0 and 1: 0 as indication of no relevance at all and 1 as indication of a maximum relevance. Term weights are ultimately used to compute the text similarity between each document that is stored in a given document base and a query that is raised by a user. Such a query will be answered by listing all documents stored, in decreasing text similarity to the query text.

The computation of term weights can be done along various lines. Here, the following method is used. For any document base text d, query text q, and term (or word or word stem) s, let $frq(s,d)$ and $frq(s,q)$ be the occurrence frequency (i.e., the number of occurrences) of s in d and s in q, respectively. Then, as i equals one of the values 1, 2, 3, or 4, the document term weight $docu\_wght_i(s,d)$ of s in d and the query term weight $quer\_wght_i(s,q)$ of s in q are computed as follows:

$$docu\_wght_i(s,d) = \frac{(frq(s,d))^{1/i}}{\sqrt{\Sigma_{r \in d}(frq(r,d))^{2/i}}} \quad (1)$$

and $$quer\_wght_i(s,q) = \frac{(frq(s,q))^{1/i} \cdot \log \frac{N}{n_s}}{\sqrt{\Sigma_{r \in q}\left((frq(r,q))^{1/i} \cdot \log \frac{N}{n_r}\right)^2}} \quad (2)$$

Here N is the total number of document texts stored in the document base, and $n_s$ and $n_r$ are the number of these document texts that contain the term s or r, respectively. Note that $\log N/n_s$ and $\log N/n_r$ are the so-called inverse document frequencies of s and r, respectively. Furthermore, the higher the value of i, the more these inverse document frequencies contribute to the term weights, and the less important the role of the occurrence frequencies is. As shown, standard values for i are integers in [1,4], but this is not an express limitation.

As mentioned before, document term weights and query term weights are used to compute text similarities between the documents in a document base and a query. For i=1, 2, 3, 4, such a similarity $text\_sim_i(d,q)$ between a document text d and a query text q is calculated as the inner product of the document term weight vector and the query term weight vector (the components of these term weight vectors are the corresponding term weights for all possible terms):

$$text\_sim_i(d,q) = \sum_{s \in q} docu\_wght_i(s,d) \cdot quer\_wght_i(s,q) \quad (3)$$

Since the document term weight vector and the query term weight vector are lengthwise normalized, the text similarity values always are between 0 and 1. Experimentally, especially with i=2 it turns out that the increasing attention for the inverse document frequencies at the cost of the decreasing attention for the raw occurrence frequencies yields better retrieval results than without such a shift in attention, and in particular, better retrieval results than with i=1. In the following, we use i=2.

It can be observed that in our formulae the inverse document frequencies (e.g., $\log N/n_s$ and $\log N/n_r$) are incorporated in the query term weights only. This is due to the fact that incorporation in the document term weights would cause a recomputation of all these term weights for each change in the document base. In other words, the solution proposed here is better suited for our target environments, which are highly dynamic. Nevertheless, despite of all the above, it is easily seen that our methods can still be considered as implementations within the vector space retrieval model.

POSTING COMPRESSION

Recalling, a posting p associated with a term s is a pair p=(d,w), such that w is the term weight of s in the document (with document identifier) d.

In the examples below, it is assumed that there are at most 65,536 documents of which postings have to be stored. Furthermore, it is also assumed that on average there are at most 256 different terms per document and thus also postings per document. This implies that a document identifier can be stored in 2 bytes and that a unique posting identifier or pointer to a posting can be stored in only 3 bytes. Finally, it is assumed that 1 byte for the storage of a term weight is precise enough to discriminate between high- and low-relevant terms. For other choices for these parameter values the method steps as well as the advantages of the invention remain the same.

For dynamic environments we consider linked-list methods to be useful. In this direction we attempt to link all postings that are associated with the same lexical term. Firstly, a posting p=(d,w) which is associated with a term s is implemented as a triple [d,w,l] associated with s; here l is a link or pointer to a next posting triple associated with s. Secondly, all posting triples of the same document (with document identifier) d are adjacently stored in a posting triple sequence $P_d$. Thirdly, all such posting triple sequences $P_d$ are concatenated into one large posting triple sequence P, which thus encodes all the postings of all the documents in the document base. Finally, there is a table T, which returns for every term s a pointer to the first posting triple in P that is associated with s. Clearly, all postings associated with a term s can be derived by using T to enter P at the first posting triple associated with s, and then using the links to move to the succeeding posting triples associated with s.

Using this method, which groups postings per document, the insertion of a new document (with document identifier) d is easy: all its posting triples are adjacently stored at the end of P, as the posting triple sequence $P_d$. Under the assumptions previously made for the size of a document base, the method requires 6 bytes for each posting: 2 bytes for a document identifier, 1 byte for a term weight, and 3 bytes for a pointer to a next posting triple.

We present a method that reduces the storage consumption in dynamic environments with 33%. In the above, a posting p=(d,w) associated with a term s was implemented as a triple [d,w,l] associated with s, where l is a link or pointer to a next posting triple associated with s. This method stores all posting triples of the same document adjacently in a posting triple sequence and thus l can be replaced by a pair (d',o'), where d' is the document identifier in the next posting associated with s and o' is the offset in $P_{d'}$ of the corresponding triple. Such a replacement assumes an additional table D, which returns for each document identifier d' the location of the first posting triple in $P_{d'}$. Assume that the table T is replaced by two tables $T_D$ and $T_O$, returning for every term s the document identifier d of the first posting associated with s and the offset in $P_d$ of the corresponding posting triple, respectively. Clearly, using $T_D$, D, and $T_O$ to enter P at the first posting triple associated with s, and then moving to succeeding posting triples associated with s by using the links and D over and over again, all postings associated with s can be derived.

Note that the document identifier d in a posting p associated with a term s is known before the corresponding posting triple $p_t$ is accessed in $P_d$: d was already part of the pointer to the triple $p_t$. And thus, the posting triple $p_t$ can be stored without the document identifier d. From the above it then follows that the n postings $p_j=(d_j,w_i)$, $1 \leq j \leq n$, associated with a term s, can be implemented as n posting triples $p_{t,j}=[w_j,d_{j+1},o_{j+1}]$ associated with s, where $o_{i+1}$ is the offset of $p_{t,j+1}$ in $P_{d_{j+1}}$ and $d_{n+1}$ and $o_{n+1}$ are undefined.

The method requires some bookkeeping time and storage space when working with offsets and using the table D. However, under the assumptions made earlier and under the assumption that there are not more than 256 terms per document, instead of 6 bytes now only 4 bytes per posting and required: 1 byte for a term weight, 2 bytes for a document identifier, and again 1 byte for an offset. Now, assume that there exists a document with more than k terms. Then the full set of postings of this document can be split up into one or more sets of k postings, and one set of no more than k postings. Furthermore, each of these sets can be associated with a pseudo document identifier, to be coupled with each other using some auxiliary table, which relates a pseudo document identifier with the corresponding factual document identifier.

RANK-FREQUENCY LAW OF ZIPF

In this section we recall the rank-frequency law of G. Zipf, which has been discussed in the cited article by Egghe. Now, according to Zipf, a relation was established between the occurrence frequency of a term in a text and its rank number, when all terms in the text are ranked according to decreasing occurrence frequency. Informally speaking, it was noticed that the product of such an occurrence frequency and of such a rank number is approximately constant.

More formally, this rank-frequency law of Zipf can be expressed as follows. For a text t and a term s in t, let frq(s,t) be the occurrence frequency of s in t. Let t be a text containing $n \geq 1$ different terms $s_1, \ldots, s_n$ and, without loss of generality, assume that these terms are ranked such that $$frq(s_1,t) \geq frq(s_2,t) \geq \ldots \geq frq(s_n,t)$$

holds. Then the rank-frequency law of Zipf claims that there exists a constant zpf(t), such that, for every $1 \leq j \leq n$, $$j.frq(s_j,t) \approx zpf(t),$$

i.e., in t the product of the rank number i of $s_i$ and the occurrence frequency $frq(s_j,t)$ of $s_j$ is approximately constant. Clearly, the Zipf constant zpf(t) depends on the text t: when the size of t increases, the occurrence frequency of the most frequent term in t and the number of different terms in t increase—according to Zipf's law they will increase evenly—and thus zpf(t) increases too.

In practice, it has been found that the law of Zipf applies best for terms that have an intermediate occurrence frequency. For an exemplary document of more than 1000 different terms, ranks 8 to 600 had a spread of no more than ±25% in the Zipf product value, while for ranks 40 to 300 the spread was only ±10%.

USE OF ZIPF'S LAW

So, the rank-frequency law of Zipf implies that a term's occurrence frequency can be estimated using the term's rank number, when all terms are ranked according to decreasing occurrence frequency. More precisely: for every text t there is a constant zpf(t), such that for every term s in t the occurrence frequency of s is approximated by the quotient of zpf(t) and the rank number of s.

For the posting compression technique, described earlier, the following can be noted. First, the order in which a document's postings are stored is not relevant. Second, although they consume a considerable part of the storage required, the term weights are not compressed in the postings.

For those term weighting retrieval methods in which the term weights are computed using the occurrence frequencies of the terms only, the observations above lead us to the following advanced compression technique for the storage of the postings of a document. First, rank all the document's postings according to decreasing occurrence frequency of the corresponding term. Next, store these postings in this ranking order in memory, in the same way and with the same auxiliary tables as described supra. However, do not really store the term weights in these postings: at retrieval time they can be approximated by application of the rank-frequency law on the rank numbers of—i.e., on the offsets pointing to—the corresponding posting triples. Thus, instead of posting triples [w',d,o] only store posting tuples [d,o], and the tables $T_D$, D, and $T_O$.

Using this compression technique it seems necessary to have access to an additional table with the predetermined Zipf constants. Furthermore, for reasons of time efficiency at moments of retrieval, it also seems economical to have access to a second table, which contains for each document the precalculated term weight normalization component (see Formula 1). However, for many terms weighting retrieval methods it turns out that both tables can be omitted, whenever the number of different terms for each document is somehow available.

So, the rank-frequency law of Zipf can be applied to store a posting of a document using 3 bytes only. Hereinafter, we detail the formulae used to approximate the term weights.

As explained, the storage and compression technique investigated is based upon the approximation of occurrence frequencies: for a text t and a term s in t, the occurrence frequency frq(s,t) of s in t can be approximated by $$frq(s,t) \approx zpf(t)/rnk(s,t),$$

where zpf(t) is the Zipf constant associated with t and rnk(s,t) is the rank number of s in the ranking of all terms in t upon decreasing occurrence frequency (these notations will be used hereafter too). Using this formula in the document weight computations, we obtain the following formulae to approximate the document term weight of a term s in a document text d (i=1, 2, 3, 4):

$$docu\_wght_i(s,d) = \frac{(zpf(d)/rnk(s,d))^{1/i}}{\sqrt{\Sigma_{r \in d}(zpf(d)/rnk(r,d))^{2/i}}} =$$

$$\frac{(1/rnk(s,d))^{1/i}}{\sqrt{\Sigma_{r \in d}(1/rnk(r,d))^{2/i}}}$$

We nicely get rid of the Zipf constant zpf(d). In consequence, the normalization coefficient associated with a document d only depends on the number of different lexical terms in d. It has been found experimentally that for high-frequency terms the document term weights are approximated too high, and that for low-frequency terms these weights are approximated too low. A slight further improvement is produced by taking the square root of the estimated occurrence frequencies instead of the raw occurrence frequencies themselves. In this way, we obtain the following formulae to approximate the document term weight of a term s in a document text d (i=1, 2, 3, 4):

$$docu\_wght_i'(s,d) = \frac{(\sqrt{zpf(d)/rnk(s,d)})^{1/i}}{\sqrt{\Sigma_{r \in d}(\sqrt{zpf(d)/rnk(r,d)})^{2/i}}} =$$

$$\frac{(1/rnk(s,d))^{1/2i}}{\sqrt{\Sigma_{r \in d}(1/rnk(r,d))^{1/i}}}$$

DESCRIPTION OF A PREFERRED EMBODIMENT

According to a general implementation of the invention, FIG. 1 is a flow chart of the method for storing bibliometric information on items in a finite source of text. In block 100 the process is initialized, by assigning intermediate storage space, necessary registers, specifying the postulated relationship between the bibliometric property of the item and its rank number in a linear ordering of all items of its source. In block 102, the items of the source are received one after the other, and evaluated with respect to their linear ordering value. Various possibilities exist therefor. First, this value can be discerned directly from the occurrence of the item, alone or in relation to its environment. Second, it is possible to deduce the bibliometric value itself from the item and translate this into the linear ordering value. This evaluating may require any of a calculatory (such as occurrency summing), histographical or other statistic operation. It is understood that after all items of the finite source have been received it would at most take a finite time to assign the linear ordering value as a scalable quantity for each respective item. In block 104 the items are stored, for example, according to decreasing values of their scalar, or of their scalable quantity, such as alphabetic, logic, or other, and subsequently assigned a rank number. It is possible to subject the items to a standard and uniform address transformation, for example reversing the address sequence, accommodating to finite page length with between-page stringing, but this is not further discussed for brevity. In block 106, the data associated to the source are now linked to the data associated to other sources, for example, those that had been scrutinized earlier. The linking may be done by concatenating. First, for any item identity the system is inspected as to where the first occurrence in the chain for that item was. The data associated with the new source now get an identifier of the source that is next in the sequence of sources featuring this item. Further, each respective item in the data associated with the new source gets an offset that points to the next occurrence of the new item. The tuples of source identifier cum offsets for each item are stored in block 108 in an associated storage location, such as a page, thereafter, the system is ready to revert to block 102 for reception of a next successive source, or to exit. For deletion of a stored source, the procedure is more complicated in that for each item in the material to be deleted, the preceding occurrence of that item is to be searched. Often, this requires starting at the beginning of a chain of occurrences of a particular item and bridging the sequence position of the data to be deleted. Thereupon, the storage location is again available for other purposes. Of course, if only ignoring the particular source is required, the trick can be done by invalidating the source.

Figure 2:
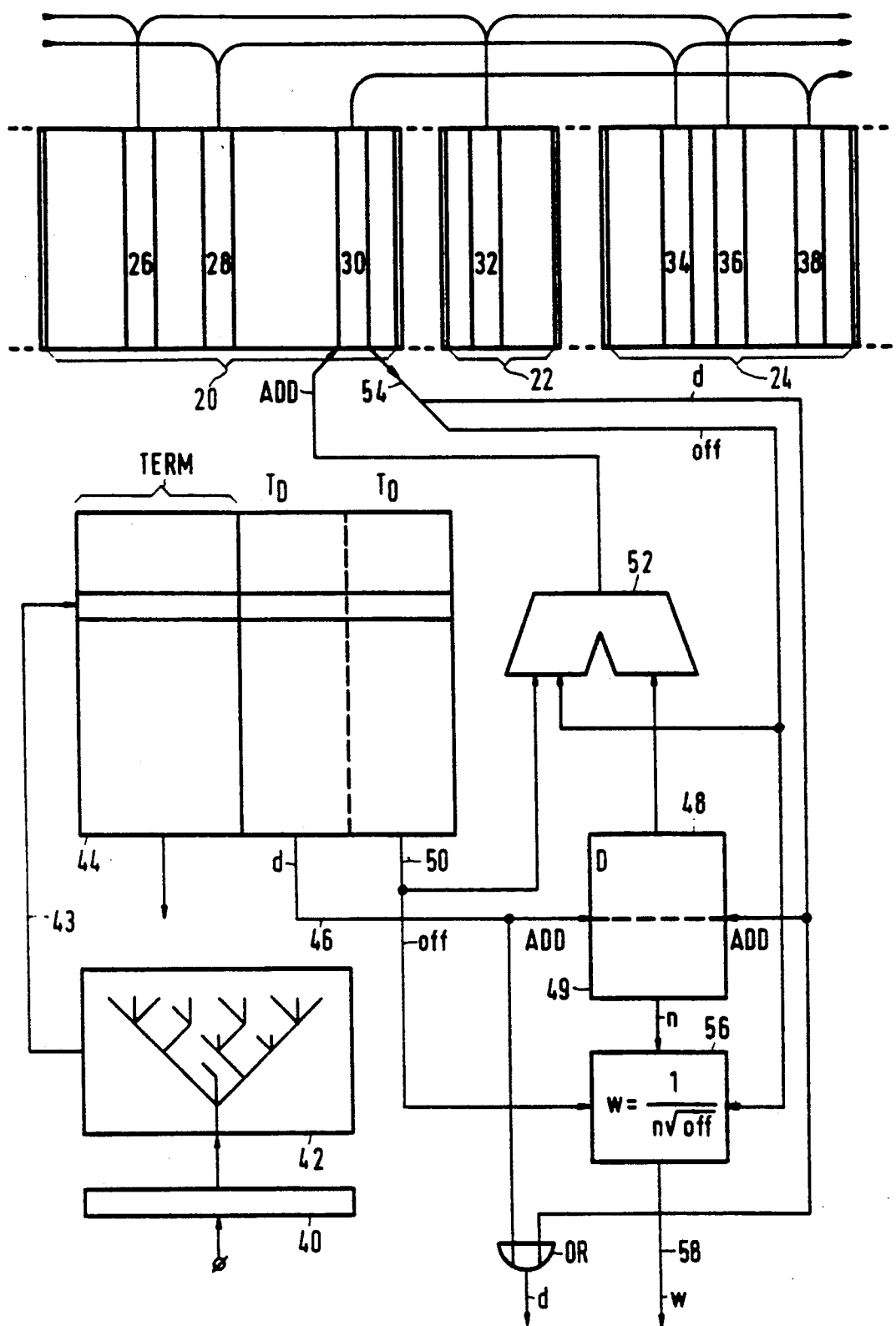
FIG. 2 a block diagram of the retrieval organization.

According to a somewhat more specific implementation of the invention, FIG. 2 shows the organization of the retrieving of document postings in a full-text document retrieval system, using the Zipf relationship between a term's occurrence frequency rank and its nominal weight. In this skeleton system only three documents are shown stored as 20, 22, 24 respectively each consisting of a number of postings or elements. Each posting may relate to a single lexical term such as a noun, an adverb, a number, or an expression, such as, for example, a mathematical expression. Alternatively, a posting may relate to a plurality of related lexical terms, such as the various ways a verb may be written, or even taking into account misspellings. As shown, document 20 has many different terms, document 24 has fewer lexical terms, document 22 still less. The storage may physically be modular, in that space is assigned on the basis of pages, which has not been shown. Each posting consists of a document identifier and an offset that together indicate the next posting associated to the same lexical term. As shown, postings 26, 32, 36 are so linked, as are postings 28/34 and 30/38. The postings are in the sequence of decreasing occurrence frequency of the lexical term within the document in question. So in document 20, lexical term associated to posting 26 occurs more frequently, than the one relating to posting 28, the one relating to posting occurring 30 still less. Not all lexical terms occur in all documents, the ranking of occurrence is not uniform among the documents. In the example given, each posting has three bytes, two for indicating the next document in the chain of postings, one for indicating the offset of the next document. This restricts the organization to 256 lexical terms per posting associated with the same lexical term in this document. The total number of lexical terms can be quite higher. If a particular document should be searched for more lexical terms there are two solutions:

a. increase the offset b. split a document into parts, that each represent a pseudo document.

Now, the retrieval organization is as follows: first the lexical term is presented on input element 40; this of course may be a register, for example accommodating the storage of a code. Next, a search, for example a tree search is executed in device 42 to find the address of that lexical term in term base table 44. By itself, such searching is considered standard technology. Term base table 44 is addressed via line 43. Each address, when used, may contain the lexical term in question, for example, to be used in associative addressing, and, furthermore, a posting of the same format as in the postings storage proper, i.e. 20, 22, 24. Often, the storage of the term is not necessary, if only the retrieval system has some means for backtracing the term's identity, or, alternatively, if the identity would not be useful per se, in that eventually, the whole document would be accessed. Now, upon read-out of the posting, the document identifier via line 46 addresses the document base table 48 and the normalization table 49. Table 48 outputs the document base address that is added to the offset on line 50 in adding means 52. The sum allows for physical addressing the first posting of the associated chain, in casu 30. None of the other postings shown are the first one of their associated chain. The read-out of the posting on line 54 allows for both addressing document base table 48 and directly providing the new offset to the left hand input of adding means 52. Synchronized by means not shown, this in each cycle allows to address a next posting of the chain. The last one may address a dummy posting that signals termination. In synchronism with the activation of base table 48, normalization table 49 outputs the normalization factor n. Further, upon provision of offset "off" to weight determination block 56 (either from 44 or from the posting storage such as in 20, 22, 24) receives the normalization factor n that is permanently stored in block 49 according to its postulated relationship with d. Block 56 according to the formula $$w = \frac{1}{n \sqrt{\text{off}}}$$

calculates the weight for outputting on output 58. The latter output is effected in conjunction with output d. The formula for w accords to the theory given earlier. The weight cum document identifier are thereupon used in the retrieval organization, which may be done along conventional ways. Inasmuch as the present embodiment is directed to the storage organization, in particular as effected in blocks 20, 22, 24, 44, 48, 52, no further disclosure has been given for reasons of brevity.

I claim:

1. In a computer-based information storage and retrieval system, a method for computer storing of bibliometric information on items in a finite source of text, using a postulated relationship between the bibliometric property of an item and its rank number in a linear ordering of all items in said source, said method comprising the steps of:

a) computing and storing a linear ordering of all items including, for any item in said source, positioning it properly in the said linear ordering, each stored item in the linear ordering having a rank number, b) determining an item's rank number in the linear ordering, c) for any item in said source, storing the item's rank number as determined in step b) above as an indication of that item's bibliometric property, d) using the item's rank number for managing information about the source.

2. A method as claimed in claim 1, further comprising:

e) assigning to each item in a particular source a sequence number based on address mapping transform that is uniform among the said sources and preserves rank order, f) for each source, storing a sequence of tuples, each of which tuples is assigned to a unique item in its source, and each tuple comprising:
  (i) an identifier for a next successive source comprising the same unique item,
  (ii) an offset value indicating both that unique item's sequence number in the source so identified as well as that unique item's rank number in said linear ordering as an indication of that unique item's bibliometric property.

3. The method of claim 2, wherein the sources are documents each having lexical terms, and further comprising the step of assigning to each lexical term a weight indicating the relevance of that term in the document, and storing the thus assigned weight.

4. A method for storing document postings in a computer-based full-text document retrieval system, said method using a postulated relationship between a lexical term's occurrence frequency rank and its nominal weight, said postulated relationship depending exclusively on this rank and on the number of different lexical terms in a particular document as variables, said method comprising the steps of:
  a) for any lexical term in a particular document, computing its occurrence frequency and therefrom said lexical term's rank in an occurrence frequency ordering of the terms,
  b) storing a normalization factor as governed by said postulated relationship,
  c) assigning to each lexical term in the particular document a sequence number based on standard address mapping transform that is uniform among said documents and preserving said rank order,
  d) for each document, storing a sequence of postings each assigned to a unique lexical term in the document according to its assigned sequence number, each posting comprising:
    (i) an identifier for a next successive document comprising the same unique term,
    (ii) an offset value operating as pointer in said next successive document while indicating said unique term's posting sequence number in said next successive document as well as a direct indication of that unique term's weight in the document so identified.

5. A method as claimed in claim 4, further comprising storing for each document a normalization factor (n) for thereby normalizing any offset received to a weight factor as dependent of the number of postings for the document in question.

6. A method as claimed in claim 5, wherein said weight is inversely proportional to the square root of the rank of occurrence frequency of the particular term in the sequence.

7. A method for computer-accessing document postings in a computer-based full text retrieval system, said method comprising the steps of:
  a) entering for a document term a term identity representation,
  b) searching for an initial posting in a posting base table that has a document identifier and an offset,
  c) executing a program loop and while in each loop traversal, by means of a most recent document identifier and most recent offset, computing a next posting address, each posting so addressed containing a next document identifier and offset thereupon featuring as being most recent,
  d) and in each loop traversal also using its offset value found as a pointer and also as a weight representation number associated to said term in respect of its occurrence in the document associated to each respective loop traversal.

8. A method as claimed in claim 7, wherein said document identifier addresses a document base table for by means of adding of a document base pointer to an actual offset generating a posting address.

9. A method as claimed in claim 8, further by means of said document identifier addressing a weight normalization factor that combines with an associated offset to a weight quantity.

* * * * *